May 16, 1933.   E. B. HEARN   1,909,401

SELF TURNING DEVICE FOR POULTRY WATERERS

Filed May 25, 1931

INVENTOR
E. B. Hearn
BY
ATTORNEY

Patented May 16, 1933

1,909,401

UNITED STATES PATENT OFFICE

EDMUND BERTRAM HEARN, OF PORTERVILLE, CALIFORNIA

SELF TURNING DEVICE FOR POULTRY WATERERS

Application filed May 25, 1931. Serial No. 539,828.

This invention relates to poultry waterer devices of a portable and invertible nature such as is shown in my copending application for patent, Serial No. 481,861, filed September 15, 1930 now Patent Number 1,851,278 issued March 29, 1932; and particularly deals with the mounting of the bail by which the device is carried.

In watering devices of this nature the bucket must be carried in an inverted position from what it occupies when in operation, in order to enable the supply of water to be initially placed therein. The drinking saucer is then connected to the bucket after which the entire device must be inverted or turned to a normal operating position. This must be quickly done in order to prevent the escape of the water during the turning operation. This is somewhat hard to manually perform in a successful manner, especially in the larger size of the device.

The principal object of the present invention is to provide a bail and a catch means associated therewith, so mounted on the bucket as to enable the same to be carried in inverted position when desired, but so arranged as to cause the bucket and saucer unit to be inverted and turned to a normal position of itself when said unit is raised and its weight supported by a lifting up on the bail.

The desired end is therefore attained without depending on a necessary rapidity of movement of the operator.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
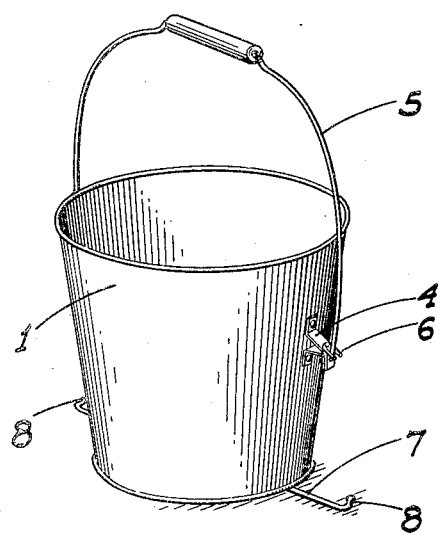
Fig. 1 is a perspective view of the bucket of the device relatively inverted or positioned to receive a supply of water.
Figure 2:
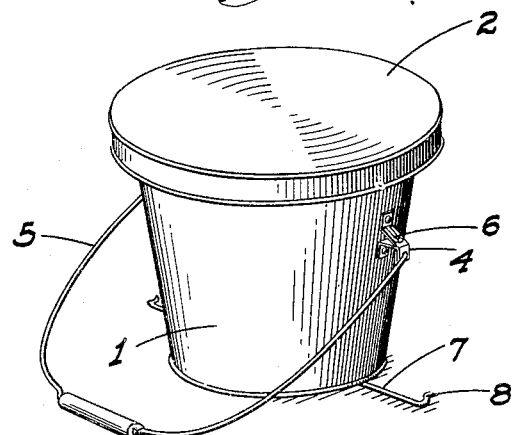
Fig. 2 is a similar view of the bucket in the same position, but with the bail lowered and the saucer attached.
Figure 3:
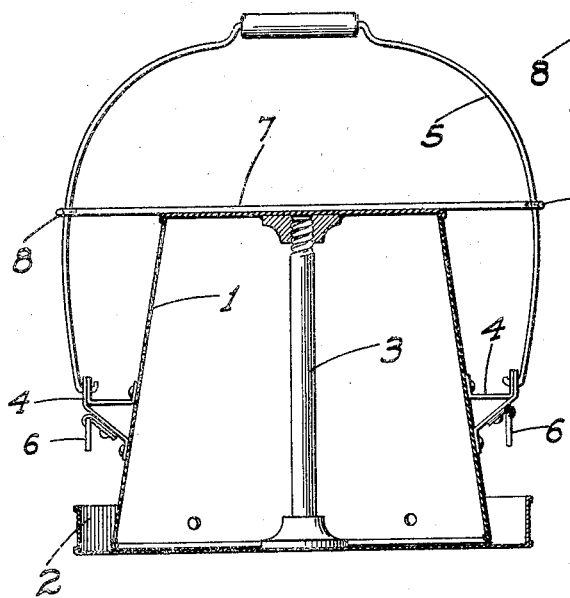
Fig. 3 is a sectional elevation of the device in its operating position.

Referring now more particularly to the characters of reference on the drawing, 1 denotes the bucket of the waterer, adapted when the device is in operation to set with its open end facing down. Adapted to engage said open end is a relatively large saucer 2, removably attached to the bucket by a stem 3 in the manner fully disclosed in said copending application, and in which saucer the water from the bucket is automatically maintained at a certain level.

Figure 4:
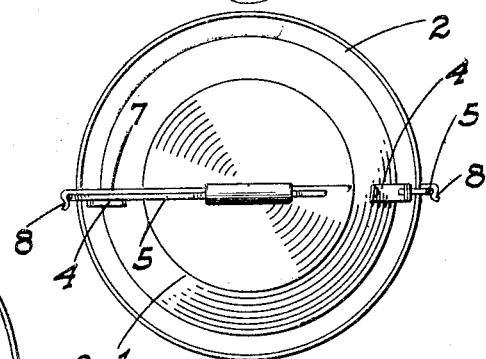
Fig. 4 is a top plan view of the device in the same position.
Figure 5:
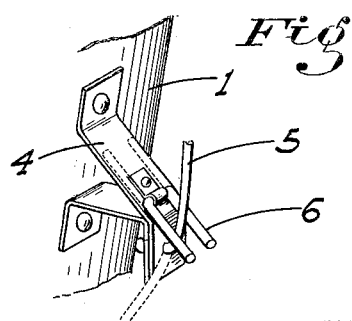
Fig. 5 is a fragmentary perspective view showing a bail catch device.

Secured to and projecting outwardly from the bucket on opposite sides are brackets 4, in which the ends of the bail 5 are pivoted. The span and depth of the bail is sufficient to enable the same to swing completely about the bucket. The brackets are disposed so that the pivotal points on the bail are substantially equidistant from the top and bottom of the bucket, and are offset somewhat on one side of the diametral line of the bucket, as shown in Fig. 4. Hinged on one bracket on the downward side of the same when the device is in its operating position is a forked catch 6, arranged when the bucket is inverted to straddle the bail above its pivot point when said bail is in a vertical and then upwardly extending position, as shown in Figs. 1 and 5. Fixed on and extending across the closed end of the bucket is a rod 7, having hooks 8 on its ends to engage the side portions of the bail when the bucket is disposed in an operating position and the bail is in a vertical and upwardly extending position. The hooks face in the direction in which the bucket naturally turns when supported from the bail and in a relatively inverted position, so that said hooks automatically engage the bail after the bucket has made a full half turn from said inverted position, and thus prevent further undesired rotation of the bucket.

In operation the bucket is first disposed as shown in Fig. 1, so that it may be filled with water and the catch 6 may then be manually engaged with the bail if desired in order to prevent rotation of the bucket and allow the same to be carried any distance in that position. When it is desired to mount the saucer in place, the catch is swung clear of the bail and the latter is allowed to swing down to one side or the other of the bucket so as not to interfere with the placing of the saucer. The bail is then raised to take the weight of the device. Owing to the offset mounting of the bail relative to the bucket and to the additional weight added to the open and then upper end of the bucket by reason of the saucer, the bucket and saucer unit immediately swings of itself in one direction through a half turn. The hooks 8 then automatically engage the bail and hold the bucket against further rotation, either in the same or in a retractive direction. The bail may then be left in that position where it is out of the way of the poultry until it is necessary to again take the device to a water supply for refilling.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desired to secure by Letters Patent is:

1. A poultry watering device including a bucket, a saucer removably mounted in connection with the bucket over the open end of the same, a bail arranged to swing completely about the saucer and bucket, releasable catch means mounted in connection with the bucket to engage the bail and hold the bail and bucket relatively rigid when the bucket is in position with its open end facing upwardly; said bail being so pivoted with respect to the bucket as to cause the bucket to turn of itself from said position when the weight of the device is supported by the bail.

2. A poultry watering device including a bucket, a saucer removably mounted in connection with the bucket over the open end of the same, a bail for the bucket arranged to swing completely about the same, and releasable catch means mounted in connection with the bucket to engage the bail and hold the bail and bucket relatively rigid when the bucket is in position with its open end facing upwardly; means pivoting said bail on the bucket in position to cause the bucket to turn of itself in one direction only from said position to a relatively inverted one when the weight of the device is supported by the bail, and additional catch means mounted on the device to engage the bail after the bucket has swung in said one direction to a relatively inverted position.

3. A device as in claim 1, with additional catch means on the device to engage the bail when the bucket has swung to a relatively inverted position.

4. A poultry watering device including a bucket, a saucer removably mounted in connection with the bucket over the open end of the same, a bail pivoted on the bucket and arranged to swing completely about the same, and releasable catch means mounted in connection with the bucket to engage the bail and hold the bail and bucket relatively rigid when the bucket is in position with its open end facing upwardly; and additional catch means mounted on the device to engage the bail when the bucket has swung to a relatively inverted position.

5. A poultry watering device comprising a bucket, a relatively large saucer removably mounted in connection with the bucket over the open end of the same, and a bail pivoted on the bucket and adapted to swing completely about the bucket and saucer.

6. A poultry waterer including a bucket, a saucer mounted in connection with the bucket over the open end of the same, a bail to swing about the bucket and saucer, pivot bearing elements for the ends of the bail mounted on the bucket substantially midway of its height and in non-diametral alinement whereby the bucket will turn of itself in one direction when the weight of the device is supported by the bail, and catch means to hold the bail rigid with the bucket after the later has thus turned.

In testimony whereof I affix my signature.

EDMUND BERTRAM HEARN.